Inventor
Henry A. Sherwood
Karl Frenewig
his Attorney

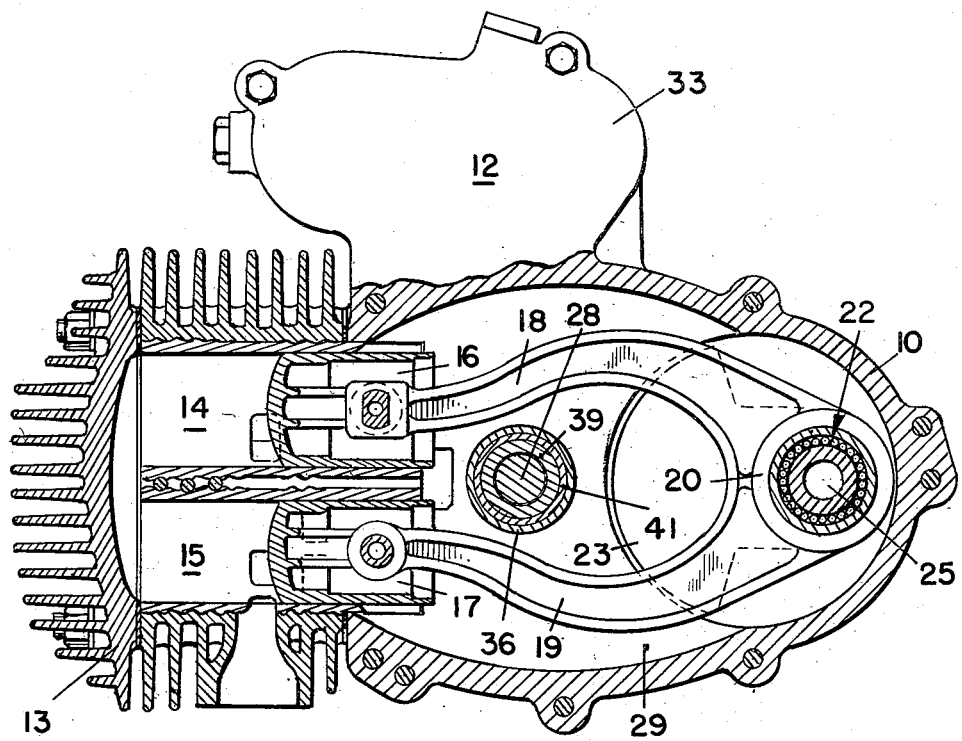

Patented Jan. 2, 1951

2,536,960

UNITED STATES PATENT OFFICE 2,536,960

MULTIPURPOSE INTERNAL-COMBUSTION ENGINE

Henry Allan Sherwood, New York, N. Y., assignor to Adrienne M. Sherwood, Tarrytown, N. Y.

Application December 13, 1946, Serial No. 715,969

13 Claims. (Cl. 121—194)

The invention relates to a power plant comprising an engine and a crank shaft driven thereby by connecting rod mechanism enclosed in a frame or casing and including supporting means therefor. There may be also included a clutch and transmission preferably arranged between the engine and crank case. The supporting means preferably will comprise a shaft or bar passing through the casing between the engine and the crank case and surrounded by a sleeve which makes an airtight joint to prevent escape from the casing or to prevent loss of pressure therein. If desired, power from the crank shaft may be transmitted to a spool, between the sleeve and the supporting bar, from which power may be taken for any desired purpose. The drive from the crank shaft to the spool may go through a clutch and transmission preferably arranged between the engine and the crank case so arranged as to vary the speed or direction, or both, of revolution of the spool as may be desired. The connecting rod mechanism will preferably be so formed and positioned that its movement and operation will not be impeded or interfered with by the presence of the supporting bar extending through the casing between the engine and the crank shaft.

Figure 1:
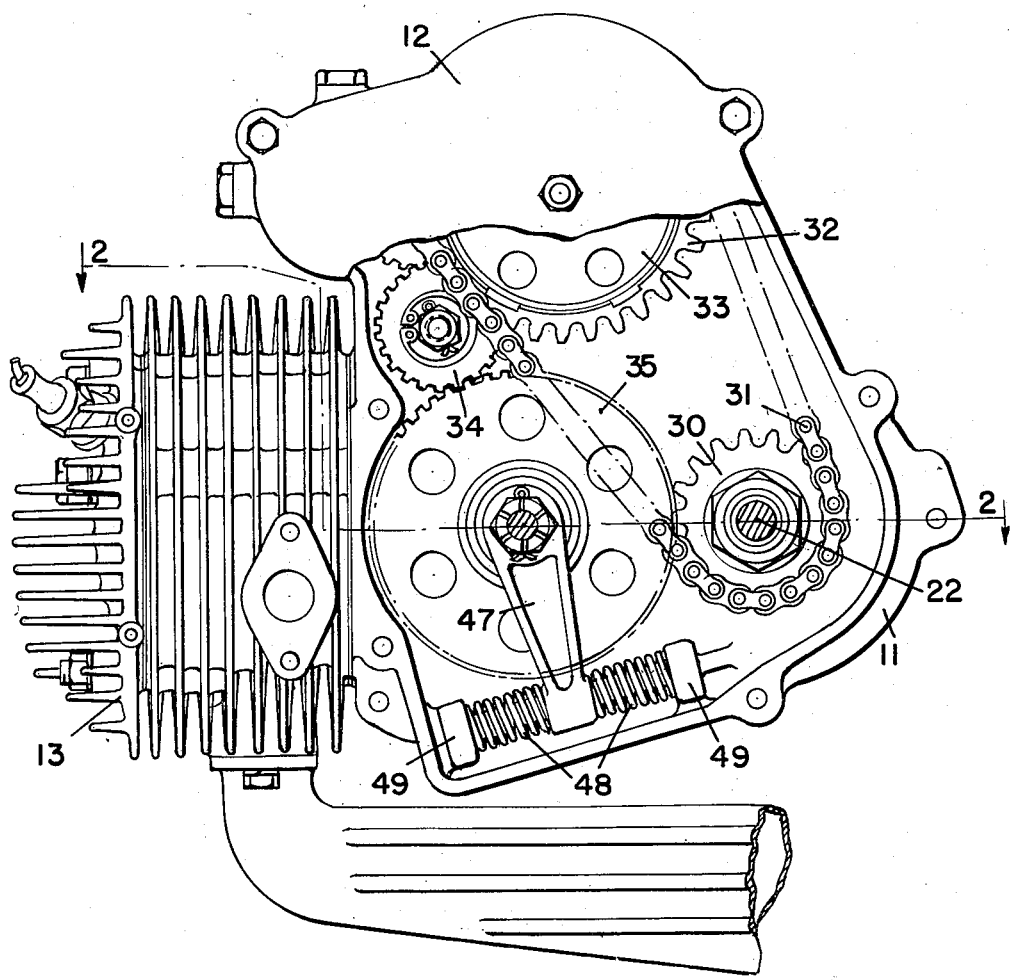
Figure 2:
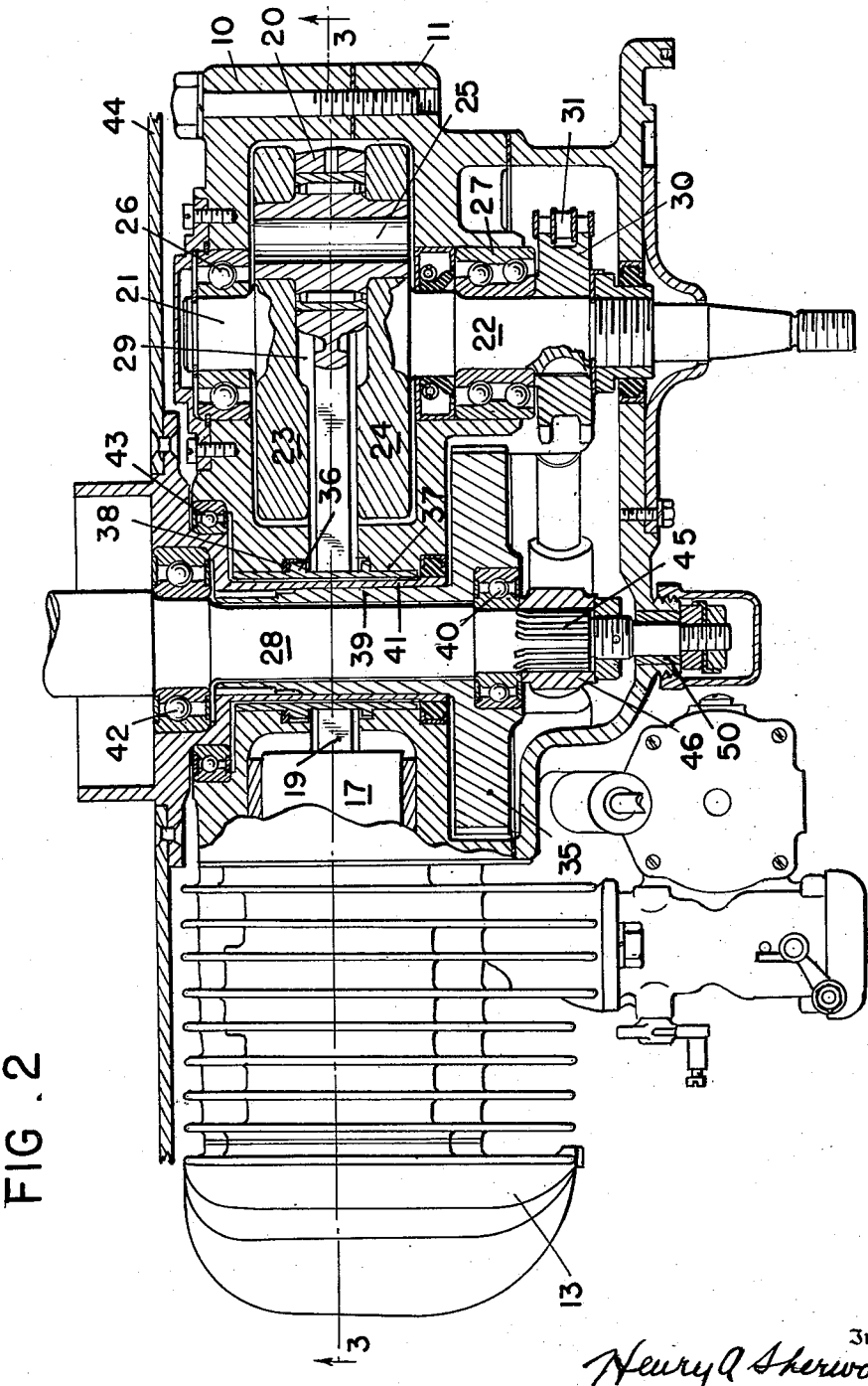

The invention is not limited to any specific mechanism but to explain it, one embodiment is shown in the accompanying drawings in which Figure 1 is a side elevation of the device with a part of the cover removed or broken away. Fig. 2 is a transverse horizontal section on the line 2—2 of Fig. 1 and Fig. 3 is a vertical section on the line 3—3 of Fig. 2.

The device may be provided with a frame or casing of two members 10 and 11 which engage at their edges and form a crank case and a closed covering for the device. There may also be included a cover 12 for covering or exposing some of the mechanism.

The engine 13 may be an explosion or internal combustion engine or of any suitable type but is here indicated as of the known uni-flow two cylinder two-stroke cycle Erlich system with asymmetric timing diagram. The two cylinders 14 and 15 are shown close together at one end of the casing with their axes parallel and in each is a reciprocating piston 16 or 17. To each piston is connected one arm 18 or 19 of a one-piece, generally U-shaped connecting rod 20. The crank shaft may be of any suitable type and is shown here as comprising two aligned short shafts 21, 22, the inner or adjacent end of each of which carries a balance weight or fly wheel 23, 24. An eccentrically arranged pin 25 between the weights 23, 24 is engaged by the connecting rod 20 so as to drive or rotate the crank shaft when the engine operates. The crank shaft sections 21 and 22 are mounted in suitable bearings 26 and 27, in the casing members 10 and 11, respectively.

Also mounted in the casing is a supporting rod or shaft 28 extending through the chamber 29 in which the gas for the engine 13 may be precompressed. The connecting rod arms 18 and 19 operate in the chamber 29 and the rod 28 lies between them. Instead of being straight as are the usual connecting rods, the arms or legs 18 and 19 of the connecting rod are curved or deflected apart. Thus, as the engine operates and the connecting rod turns the crank shaft, the arms 18 and 19 may move in the proper manner (upwardly and downwardly and forwardly and backwardly in Fig. 3) without striking or being interfered with by the supporting rod 28.

As will be apparent from Fig. 3, the center of the crank shaft 22 and the center of the supporting bar 28 lie in a common plane which passes between the cylinders 14 and 15, and further, that the centers of the cylinders 14 and 15 are offset to one side of the center of the crank shaft 22.

One end of the crank shaft 22 is shown as projecting from the casing and this may be directly or indirectly connected to any device it may be desired to operate from the engine.

On the shaft 22 is shown mounted a gear or sprocket wheel 30 over which runs a chain 31 shown as running over a sprocket 32 forming part of any suitable form of clutch and transmission 33 which may drive an idler gear 34 at any selected speed and direction which in turn is in driving engagement with a gear wheel 35.

Surrounding the supporting rod 28 is a cylindrical sealing sleeve 36 which may have a drive fit at 37 into one member 11 of the casing and may be provided with a socket having a packing 38 in the other casing member 10. Thus, there is provided an air tight closure about the rod so that there shall be no leakage from the chamber 29. As shown, the chamber 29 may be a precompression chamber for the engine fuel but with other types of engines it may carry lubricating oil for the crank, etc. In any event the sleeve 36 and its sealing may prevent leakage from the chamber 29.

The gear 35 is on a tube or sleeve 39 supported by the bearing 40 on the supporting rod 28 and extending about the rod 28 and between it and the sealing sleeve 36. Surrounding and keyed to the sleeve 39 is a sleeve or thimble 41 riding in the sealing sleeve 36 and extending between it and the rod 28 and being free to rotate between the bearing 42 on the shaft 28 and the bearing 43 in the casing 10. Thus, when the gear 35 is driven it rotates the sleeves 39 and 41. On the sleeve 41 may be a wheel 44 from which power may be taken for any purpose desired. The elements 35, 39, 41 and 44 when assembled may constitute a spool or spool-like arrangement of separate parts for convenience of assembly. The gear 35 may be driven directly or indirectly by any suitable means from the crank shaft 22, there being shown a driving means which includes the gear 30, the chain 31, the gear shift 33 and the idler 34.

Ignition current for the engine may be supplied by any suitable means such as the usual magneto (not shown) which may be built in or added and associated with any desired rotating part of the mechanism in any suitable manner.

Preferably at its end opposite the wheel 44, the supporting rod or shaft 28 may be splined as at 45 to a nut 46 from which extends a lever arm 47, the end of which rests between springs 48 against stops 49 shown on the frame member 11 providing an anchorage to compensate for vibration, jarring, etc. from the operation of the engine or other causes. At its end, the supporting shaft 28 rests in a bearing 50 in the casing member 11 or the cover 12 part of it. The supporting shaft 28 is stationary and does not rotate with any other portion of the apparatus and acts as the sole support needed for the apparatus. It is between the engine 13 and the crank shaft 21, 22. The engine 13 and the parts 16, 17, 20, 21, 22, and 23 with the casing members 10 and 11 are supported by the bearings 43 and 50. If desired the shaft or rod 28 may be the axle of a vehicle or it may be fastened in any desired place in any desired way. The rod 28 is threaded at a point beyond the bushing 50, as shown in Fig. 2, for the reception of nuts for securing the rod against longitudinal movement relative to the casing 10—12.

The clutch and transmission 33, as shown in Fig. 1, is located between the engine or cylinder 13 and the crank shaft 21, 22, thus saving space, adding to economy of construction, installation and operation, and making for a properly balanced device to insure the efficiency of the centrally placed supporting rod 28.

Various changes may be made in size, form and arrangement of the apparatus without departing from the invention.

I claim as my invention:

1. A power plant, comprising: an internal combustion engine having a casing, a cylinder at one end of said casing, a piston in the cylinder, a crank shaft rotatably mounted in the other end of the casing, and a connecting rod attached at one end to the crank shaft and at its other end to the piston; a supporting bar for said engine arranged parallel with the crank shaft and extending through the casing at a point intermediate the cylinder and the crank shaft; a driven member rotatably mounted on the supporting bar and also rotatable relative to the casing; and means for transmitting driving torque from the crank shaft to the driven member.

2. A power plant as defined in claim 1, including means restraining rotation of the casing relative to the supporting bar.

3. A power plant, comprising: an internal combustion engine having a casing, a cylinder at one end of said casing, a piston in the cylinder, a crank shaft rotatably mounted in the other end of the casing, and a connecting rod attached at one end to the crank shaft and at its other end to the piston; a supporting bar for said engine arranged parallel with the crank shaft and extending through the casing at a point intermediate the cylinder and the crank shaft, the center line of the crank shaft being offset to one side of the center line of the cylinder; a driven member; means on the supporting bar and in the casing journalling said driven member for rotation relative to both the supporting bar and the casing; means for transmitting driving torque from the crank shaft to the driven member; and means restraining rotation of the casing relative to the supporting bar.

4. A power plant, comprising: an internal combustion engine having a casing, two cylinders at one end of said casing, a piston in each of the cylinders, a crank shaft rotatably mounted in the other end of the casing, and a connecting rod attached to the crank shaft and including arms connected to the piston in each of the cylinders; a supporting bar for said engine arranged parallel with the crank shaft and extending into the casing between the arms of the connecting rod; a driven member rotatably mounted on the supporting bar and being rotatable relative to the casing; means for transmitting driving torque from the crank shaft to the driven member; and means restraining rotation of the casing relative to the supporting bar.

5. A power plant as defined in claim 4, in which the means restraining rotation of the casing relative to the supporting bar comprises, a lever secured at one end to the supporting bar, a pair of stops on the casing, and a spring between the other end of the lever and each stop.

6. A power plant as defined in claim 4, in which the connecting rod is of one-piece and generally U-shaped and in which the arms of the connecting rod are curved.

7. A power plant as defined in claim 4, including means securing the supporting bar against longitudinal movement relative to the casing.

8. A power plant, comprising: an internal combustion engine having a casing, two cylinders arranged side by side at one end of said casing, a piston in each of the cylinders, a crank shaft rotatably mounted in the other end of the casing, and connecting rod means attached to the crank shaft and to a piston in each of the cylinders; a supporting bar for said engine arranged parallel with the crank shaft and extending through the connecting rod means, the axis of said crank shaft and the center of said supporting bar lying in a common plane with passes medially between the cylinders; a driven member on the supporting bar and being rotatable relative to both the supporting bar and the casing; means for transmitting driving torque from the crank shaft to the driven member; and means restraining rotation of the casing relative to the supporting bar.

9. A power plant, comprising: an internal combustion engine having a casing, two cylinders at one end of said casing, a piston in each of the cylinders, a crank shaft rotatably mounted in the other end of the casing, and connecting rod means attached to the crank shaft and to the piston in each of the cylinders; a cylindrical sleeve mounted in the casing parallel with the crank shaft and located between the cylinders and the crank shaft; a driven member rotatable relative to the cylindrical sleeve and including a hollow portion disposed in the cylindrical sleeve and a gear rotatable with the hollow portion; a supporting bar for said engine extending into the hollow portion of the driven member and providing a journal for the driven member; and means for transmitting driving torque from the crank shaft to the gear of the driven member.

10. A power plant, comprising: an internal combustion engine having a casing, two cylinders at one end of said casing, a piston in each of the cylinders, a crank shaft rotatably mounted in the other end of the casing, and connecting rod means attached to the crank shaft and including arms connected to the piston in each of the cylinders; a cylindrical sleeve mounted in the casing parallel with the crank shaft and extending between the arms of the connecting rod means; a driven member including a hollow portion disposed in the cylindrical sleeve and another portion disposed exteriorly of the casing; bearing means in the casing supporting said driven member for rotation relative to the casing; a supporting bar for said engine extending into the hollow portion of the driven member and providing a journal for the driven member; and means for transmitting driving torque from the crank shaft to the driven member.

11. A power plant as defined in claim 10, in which the cylindrical sleeve is mounted in the casing with its exterior in fluid tight relation to the casing.

12. A power plant, comprising: an internal combustion engine having a casing, a cylinder at one end of said casing, a piston in the cylinder, a crank shaft rotatably mounted in the other end of the casing, and a connecting rod attached at one end to the crank shaft and at its other end to the piston; a supporting bar for said engine arranged parallel with the crank shaft and extending laterally at one side of said casing; a wheel rotatably mounted on the supporting bar and also rotatable relative to the casing; means for transmitting driving torque from the crank shaft to the wheel; and yieldable means permitting limited rotary movement of said casing relative to said supporting bar.

13. A power plant, comprising: an internal combustion engine having a casing, a cylinder at one end of said casing, a piston in the cylinder, a crank shaft rotatably mounted in the other end of the casing, and a connecting rod attached at one end to the crank shaft and at its other end to the piston; a supporting bar for said engine arranged parallel with the crank shaft and extending laterally at one side of said casing; a wheel rotatably mounted on the supporting bar and also rotatable relative to the casing; means for transmitting driving torque from the crank shaft to the wheel; an arm connected at one end thereof with said supporting bar; a pair of stops on said casing, the other end of said arm being disposed between said stops; and a spring between each stop and said other end of said arm.

HENRY ALLAN SHERWOOD.

REFERENCES CITED

The following references are of record in the file of this patent:

UNITED STATES PATENTS

| Number | Name | Date |
| --- | --- | --- |
| 653,855 | Torbensen | July 17, 1900 |
| 792,663 | Lufkin | June 20, 1905 |
| 899,746 | Levedahl | Sept. 29, 1908 |
| 1,360,110 | Harley | Nov. 23, 1920 |
| 1,367,825 | Moore | Feb. 8, 1921 |
| 1,777,478 | Schaeffers | Oct. 7, 1930 |
| 1,836,658 | Goodwin | Dec. 15, 1931 |
| 1,858,996 | Lesage | May 17, 1932 |
| 1,947,045 | Hoffman | Feb. 13, 1934 |
| 1,947,375 | Broderson | Feb. 13, 1934 |
| 2,056,088 | Berry | Sept. 29, 1936 |
| 2,168,096 | Ehrlich | Aug. 1, 1939 |
| 2,169,120 | Busby | Aug. 8, 1939 |
| 2,169,236 | Frazier | Aug. 15, 1939 |
| 2,380,778 | Murdock | July 31, 1945 |